Aug. 14, 1962   F. G. FABIAN, JR., ET AL   3,049,617
FLUID FLOW METER
Filed Dec. 9, 1957   2 Sheets-Sheet 1
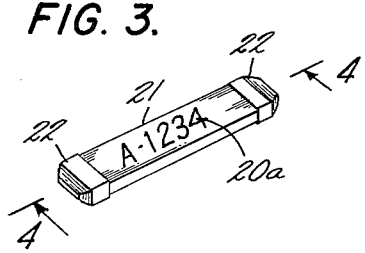
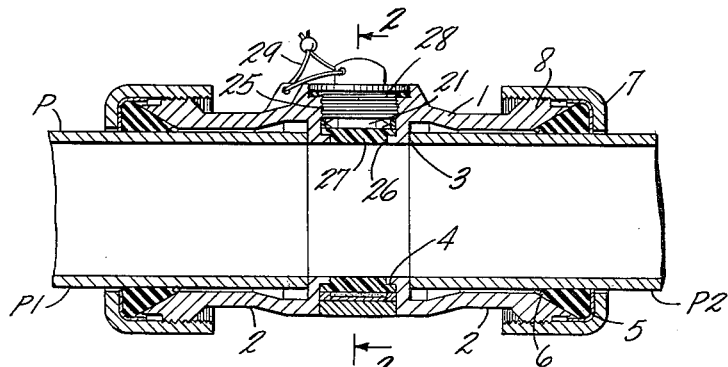
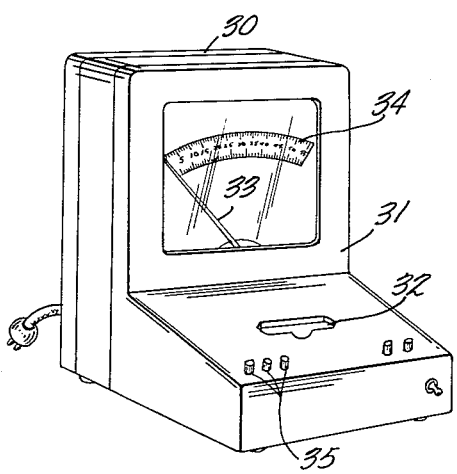
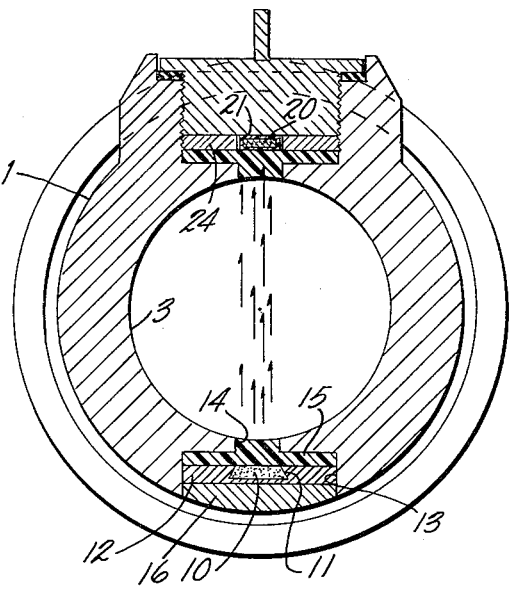

3,049,617
Patented Aug. 14, 1962

3,049,617
FLUID FLOW METER
Francis G. Fabian, Jr., Bradford, Pa., John P. Mann, Clintonville, Wis., Henry Knippenberg, Columbus, Ohio, and Richard E. Wainerdi, College Station, Tex., assignors to Dresser Industries, Inc., Dallas, Tex., a corporation of Delaware
Filed Dec. 9, 1957, Ser. No. 701,506
16 Claims. (Cl. 250—43.5)

The present invention relates to meters for measuring the flow of fluid in a line and particularly for measuring the amount of fluid flowing through the line in a selected period of time. For example, meters in accordance with the invention are applicable for measuring the quantity of gas, water or other fluid consumed by a customer.

Meters at present in common use operate by mechanical movement effected by flow of the fluid. Such meters are relatively complicated and expensive. Considerable difficulty is experienced in attaining the desired accuracy under varying operating conditions. Moreover, as applied to measuring the flow of gas such meters have the disadvantage that they measure the volume rather than the weight of gas. As the density of gas varies with its temperature, a consumer will receive less gas in terms of weight when the temperature is higher.

It is an object of the present invention to provide a meter operating on different principles and having important advantages over meters presently available. In accordance with the invention fluid flow is measured and "recorded" by means of a radioactive emitter and a receiver associated with a passageway through the fluid flows and arranged so that the receiver is subjected to radiation from the emitter in an amount proportional to the rate of flow. The receiver comprises an element having a measurable characteristic that is progressively modified by radiation from the emitter in proportion to the total amount of radiation received. Hence, the total change in the receiver in a selected period of time is proportional to the total amount of fluid flowing through the passageway during that period. For example, the receiver may comprise germanium or other semiconductor having the characteristic that its electrical resistance is varied in proportion to the total amount of radiation to which it is subjected. Hence the change in resistance can be measured and provides a measure of integrated fluid flow.

When a meter in accordance with the invention is used for measuring the flow of a gas through a pipe line, the gas itself is conveniently utilized as a means for varying the radiation received by the receiver in proportion to the rate of flow. This is accomplished by locating the emitter and receiver on opposite sides of a passageway through which the gas flows so that the radiation passes transversely through the gas stream. The molecules of gas partially block the radiation and hence the amount of radiation received by the receiver increases with a decrease of molecular density. If a meter in accordance with the invention is installed in a service line between a supply main of substantially constant pressure and a "load," the gas pressure and hence the gas density in the meter will decrease with an increase in the load because of the resistance drop in the service line. The amount of radiation received by the receiver and hence the total change effected in the receiver during a selected period of time will hence depend on the amount of the load and the time during which the load continued. Hence the total change in the receiver will provide a measure of the total amount of gas consumed by the load during the selected period. It will be seen that since the change in the receiver is dependent on the number of gas molecules in the path between the emitter and the receiver, the meter gives a true reading of the weight of gas consumed. Thus, if the gas is used as fuel, the meter reading indicates the weight of gas and hence its B.t.u. content rather than its volume. The variation of gas density with variation of rate of flow—and hence the accuracy of the meter—is improved by providing in the pipe line a Venturi or other change of cross sectional area which produces a greater change in density upon change in velocity.

Alternatively additional means may be provided for varying the amount of radiation received by the receiver in proportion to the rate of flow of fluid through a passageway. For example, such means may take the form of a movable shield or valve member which is located in the passageway so as to be deflected by the fluid flow and is interposed between the emitter and receiver so as to shield the receiver from radiation by an amount depending on the deflection of the valve member. Another alternative is to locate the emitter and receiver at opposite sides of a manometer tube which is connected to the fluid passageway in such manner that a body of liquid in the manometer tube is displaced by an amount proportional to the rate of flow of fluid through the passageway. The emitter and receiver are located so that the liquid in the manometer constitutes a movable shield which intercepts radiation from the emitter by an amount proportional to the deflection of the body of liquid and hence proportional to the rate of flow of fluid in the passageway.

The invention will be more fully understood from the following description and claims and from the accompanying drawings which illustrate by way of example several preferred embodiments.

In the drawings:

FIGURE 1 is a longitudinal section of a fluid flow meter in accordance with the invention shown installed in a pipe line.

FIGURE 2 is a cross section taken on the line 2—2 in FIG. 1.

FIGURE 3 is an enlarged perspective view of a receiver forming a part of the meter.

FIGURE 4 is an enlarged longitudinal section of the receiver shown in FIG. 3.

FIGURE 5 is a perspective view of an instrument for determining the amount of change in a receiver and thereby determining the amount of fluid flow.

Figure 6:
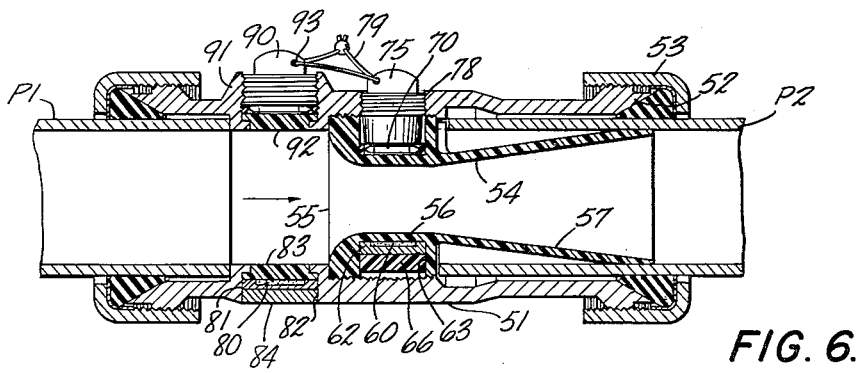
FIGURE 6 is a longitudinal section of a second embodiment.

The meter shown by way of example in FIG. 1 comprises a body portion or casing 1 adapted to be installed in a pipe line P. The casing is shown in the form of a sleeve having end portions 2 of a diameter to receive the end portions of pipe section P1 and P2 and a central portion 3 defining a passageway 4 having an internal diameter approximately equal to the inner diameter of the pipe sections. The ends of the pipe sections P1 and P2 are inserted in the end portions of the sleeve 1 and abut the central portion 3 so as to provide a substantially smooth and uninterrupted passageway for flow of the fluid to be measured. Means is provided for making a fluid tight connection between the sleeve 1 and the pipe section. The connecting means is illustrated as comprising annular gaskets 5 seated in gasket recesses 6 at the ends of the sleeve member and annular internally threaded followers 7 which screw onto externally threaded portions 8 at the ends of the sleeve to apply pressure to the gaskets and thereby provide a fluid tight joint.

A radioactive emitter 10 and a receiver 20 are mounted at diametrically opposite sides of the passageway 4 in the central portion 3 of the housing so that radiation from the emitter is transmitted transversely through the stream of fluid flowing through the passageway. The emitter 10 comprises a body of radioactive material held in a recess 11 of a shield 12. The shield 12 together with the emitter 10 is received in a recess 13 in the casing 1 which opens radially into the passageway 4 through an aperture 14. The aperture 14 is closed by a window 15 formed of plastic or other material that is pervious to the radiation of the emitter 10. The inner surface of the window is preferably flush with that of the casing to avoid turbulence of fluid flow. The emitter 10 and its shield 12 are held between the window 15 and an outer closure 16. The emitter is preferably sealed in its recess permanently or semi-permanently so that it cannot be removed by any unauthorized person. For this purpose, the closure 16 may comprise a plug which is welded or otherwise suitably secured in position.

The active material of the emitter 10 preferably comprises a nuclide or other material emitting relatively soft beta rays. Among those that are satisfactory are chlorine-36 which has a half life of $3 \times 10^5$ years with a beta energy of 0.714 million electron volts and technetium-99 with a half life of $2.12 \times 10^5$ years and a beta energy of 0.29 million electron volts. The shield 12 is preferably formed of lead or other material having a high opacity to the radiation of the emitter.

The receiver 20 comprises material having a measurable characteristic that is progressively changed by the radiation of the emitter 10. A material suitable for this purpose is a semiconductor, the electrical resistance of which is changed progressively by radiation. Germanium and other semi-conductors of the germanium chemical family are suitable for this purpose. For convenience of handling, a crystal or wafer of the active material of the receiver is sealed in a plastic or other capsule 21. As illustrated in FIGS. 3 and 4 the capsule is of elongated configuration and is provided at its ends with electrical terminal caps 22 which provide convenient means for connecting the capsule into an electrical circuit for measuring its resistance. The capsule 21 is positioned by a holder 24 in a recess 25 provided in the casing 1 diametrically opposite the recess 13 for the emitter 10. The recess 25 opens into the interior of the casing through the aperture 26 closed by a window 27 which is similar to the opposite window 15. Means is provided for holding the capsule 21 in the recess in such manner that it can be readily removed but will not be removed by an unauthorized person. For this purpose, the recess 25 is internally threaded and a plug 28 is screwed down in the recess to hold the capsule in place. A sealing wire 29 passing through holes in a projecting portion of the plug and a lug on the casing guards against removal of the plug by an unauthorized person. The sealing wire may be of the type currently used for sealing gas and electric meters.

As will be seen in FIGS. 1 and 2, radiation from the emitter 10 is transmitted diametrically across the stream of fluid flowing through the passageway 4 and strikes the receiver 20. It will be understood that molecules of a gas flowing through the passageway intercept a portion of the radiation. Hence the radiation reaching the receiver is dependent on the molecular density of the gas. If the meter is installed in a service line between a main supplying gas at a substantially constant pressure and gas appliances in a building, the pressure—and molecular density—of the gas at the meter will vary in accordance with the amount of gas being used by the appliances. As the use increases, the pressure will decrease. Under static conditions, a predetermined change in the receiver 20 will be effected by radiation from the emitter 10 in a selected period of time, for example, one month. If gas is being used by the appliances in the building, the change will be greater because of the lesser pressure and lesser molecular density. Hence the amount of change serves as a measure of the amount of gas used. The consumption of gas is thus cumulatively recorded in terms of the change effected in the receiver by radiation transmitted from the emitter. At the end of the selected period the amount of gas that has been used is "read" by determining the amount of change that has occurred in the receiver since the last reading. Thus, when the receiver comprises germanium or other semi-conductor, the resistance of which is progressively increased by radiation, the reading is effected simply by measuring the resistance of the receiver. When meters in accordance with the invention are used by a public utility or other gas distribution system, reading of the meters is conveniently effected by collecting the capsules and bringing them to a central office, a new capsule being inserted in the meter when the previous one is removed. Each capsule is identified by a suitable number or symbol as indicated at 20a in FIG. 3. At the central office, the resistances of the capsules are measured and the gas consumption is determined by comparison with the previous reading. The reading can readily be effected by automatic business machinery or with relatively simple instruments.

An instrument 30 for reading the capsules is illustrated by way of example in FIG. 5. The instrument is shown as comprising a suitable case 30 having a socket 32 for receiving the capsule 21. The socket is provided with suitable contacts engaging the terminals 22 of the capsule. The instrument is essentially an ohmeter provided with a pointer 33, scale 34, and suitable controls 35. However, the scale is preferably calibrated in terms of gas consumption rather than in terms of ohms so that the instrument is direct reading.

Another embodiment of the invention is illustrated in FIG. 6. The meter comprises a casing 51 adapted to be coupled between the adjacent ends of pipe section P1 and P2, for example by means of gaskets 52 and followers 53. In the interior of the casing 51, there is provided a Venturi tube 54 having a mouth 55, a throat 56, and a gradually diverging portion 57. The Venturi tube 54 is preferably formed of plastic or other material which is permeable to radiation. A radioactive emitter 60 and a receiver 70 are positioned diametrically opposite one another at or near the throat of the Venturi where the molecular density of a gas flowing through the Venturi is proportional to the rate of gas flow. The emitter 60 is held in a recess of a shield 62 which in turn is disposed in a recess 63 formed in the body portion of the Venturi tube 54. The shield 62 and emitter 60 are permanently held in place by a closure plug 66. The receiver 70 is like the receiver 20 illustrated in FIGS. 3 and 4 and is preferably encapsulated in like manner. It is received in a recess 75 formed in the body portion of the Venturi tube opposite the emitter 60 and is held in place by a removable screw plug 78 secured by a sealing wire 79.

As the rate of flow of gas through the Venturi increases, the pressure and hence the molecular density of the gas at the Venturi throat correspondingly decreases. The shielding effect of the gas in intercepting radiation from the emitter 60 to the receiver 70 is proportional to the gas density and hence to the rate of flow. The meter thus operates in the same manner as described with reference to FIG. 1 but is more accurate since the Venturi tube produces a greater change in molecular density of the gas for each increment of change of velocity.

In order to compensate for changes in the pressure supplied by the gas main and for changes in temperature, it is desirable to provide the meter with a "control." For this purpose, a second emitter 80 and a second receiver 90 are positioned diametrically opposite one another ahead of the Venturi 54 in a portion of the casing 51 having an inner diameter substantially equal to the inner diameter of the pipe line. The emitter 80 with its shield 81 is seated in a recess 82 having a window 83 and is sealed in the recess by a closure 84. The receiver 90 is preferably encapsulated like the receiver 20 of FIGS. 3 and 4 and is positioned in a recess 91 provided with a window 92, being held in place by a screw plug 93.

As explained above, the pressure and hence the molecular density at the throat of the Venturi varies with the rate of flow of gas through the pipe line. The pressure ahead of the Venturi where the emitter 80 and receiver 90 are located is more nearly static, being affected only by an overall drop of pressure in the service line when gas is being used by appliances served by the line. Hence the emitter 80 and receiver 90 serve as a reference or "control" for the unit comprising the emitter 60 and receiver 70. A reading of the amount of gas used is obtained by comparing the change produced in the receiver 70 with that produced during the same period in the receiver 90.

Figure 7:
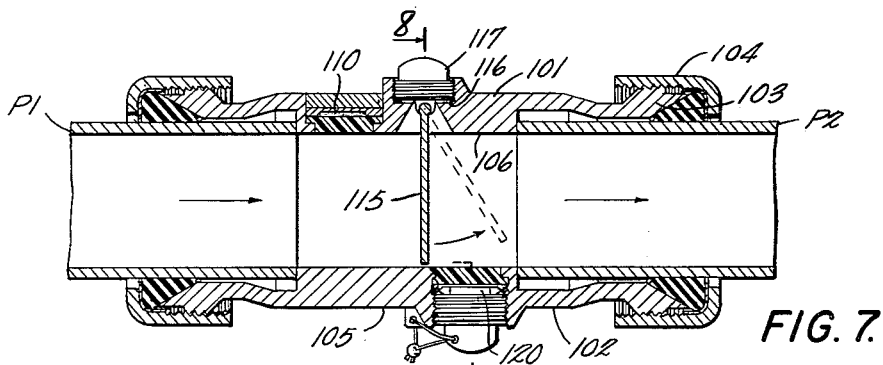
FIGURE 7 is a longitudinal section of a third embodiment.

In FIG. 7 there is shown a further embodiment of the invention in which additional means is provided for varying the radiation received by the receiver in proportion to the rate of flow of fluid through the pipe line. The meter is shown as comprising a tubular casing 101 having end portions 102 provided with gaskets 103 and followers 104 for connecting the casing between pipe sections P1 and P2 and a central portion 105 providing a passageway 106 which is aligned with and has substantially the same diameter as the pipe line. An emitter 110 and a receiver 120 are held in recesses in the central portion of the casing and are located at diametrically opposite sides of the passageway 106. The emitter 110 and the receiver 120 are similar to the emitter 10 and receiver 20 illustrated in FIGS. 1 to 4 and are housed in the casing in like manner. However, instead of being directly opposite one another they are offset slightly in a direction longitudinal of the passage. Between the emitter and receiver there is provided a movable shield or valve member 115 which is shown as being pivoted at 116 so as to be swingable by the stream of fluid flowing through the passageway. The valve member 115 is formed of lead or other material that is relatively opaque to radiation from the emitter 110. In static condition when there is no flow of fluid through the passageway, the valve member 115 intercepts radiation from the emitter 110 and thus, at least partially, shields the receiver 120. The valve member 115 is biased to static position, for example by gravity. Upon the flow of fluid through the passageway, the swingable valve member 115 is deflected by an amount dependent on the rate of flow. When thus deflected it is swung so as partially to uncover the receiver 20 and thereby subject the receiver to radiation from the emitter 10 in an amount proportional to the amount of deflection of the valve member and hence proportional to the rate of flow of fluid through the passageway. The valve member 115 is conveniently removable from the casing 110 by removing a plug 117 screwed into a threaded opening in the casing.

Figure 9:
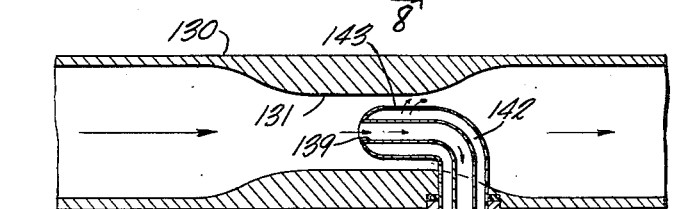
FIGURE 9 is a longitudinal section of a fourth embodiment.
Figure 8:
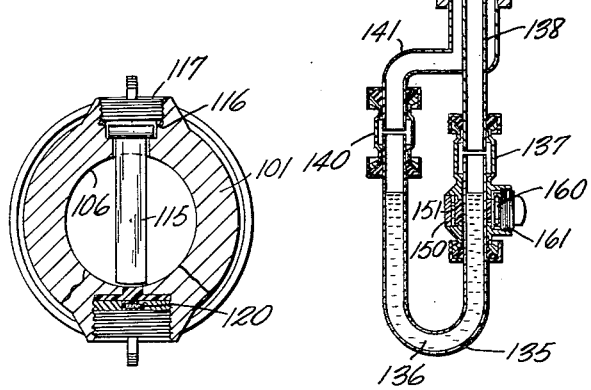
FIGURE 8 is a cross section taken approximately on the line 8—8 in FIG. 7.

FIG. 9 illustrates a further embodiment of the invention in which the means for varying the radiation received by the receiver in proportion to the rate of flow of fluid through the passageway comprises a body of liquid in a manometer tube. The meter is shown as comprising a tube or casing 130 having a portion providing a passageway 131 of lesser cross sectional area than the preceding and succeeding portions of the pipe line. One leg of a manometer tube 135 containing a body of mercury or other liquid 136 is connected by couplings 137 to a Pitot tube 138 having a mouth 139 opening axially in the passageway 131 in a direction opposite to the direction of flow. The other leg of the manometer tube 135 is connected by a coupling 140 to a tube 141, a portion of which surrounds the Pitot tube 138 to provide an annular space 142. One or more openings 143 connect the space with the passageway 131. When a fluid is flowing through the passageway 131 in the direction of the arrows, the resulting Venturi effect and the Pitot effect of tube 138 combine to produce a displacement of the liquid body 136 from the static position shown in the drawing. The amount of displacement is proportional to the rate of flow.

An emitter 150 and a receiver 160 are mounted on diametrically opposite sides of the manometer tube 135 at a position slightly below the static liquid level in that leg of the manometer in which the liquid is depressed by fluid flow through the passageway 131. The emitter and receiver are illustrated as being housed in a portion of a casing constituting the coupling 137. The emitter and receiver are like those of FIGS. 1 to 4 and may be housed in like manner, the emitter being sealed in by a closure 151 and the receiver being held in place by a screw plug 161.

It will be understood that under static conditions the receiver 160 is at least partially shielded by the liquid body 136 from the radiation of the emitter 150. When fluid is flowing through the passageway 131 in the direction of the arrows the liquid level in the leg of the manometer tube connected to the Pitot tube 138 is depressed by an amount proportional to the rate of flow. The shielding of the receiver 160 from the radiation of the emitter 150 is thereby decreased by an amount proportional to the depression of the liquid and hence proportional to the rate of flow of fluid through the passageway 131. Hence the cumulative effect of the radiation on the receiver is proportional to the integrated amount of fluid flowing through the passageway of the meter.

From the foregoing description and the accompanying drawing, it will be seen that meters in accordance with the present invention are of simple construction and are very small and compact. The collection of the receiver capsules from the meters can be done by relatively unskilled workmen. Error is avoided since the workmen are not required to read the meter. The reading is done at a central office and can be done by automatic or semi-automatic equipment. When the gas being measured is itself used as the medium for varying the radiation received by the receiver in proportion to the rate of gas flow, the meter has the further advantage that is measures the gas by molecular density and hence gives a true reading of the weight of gas received by a customer.

The embodiments illustrated in the drawings are shown only by way of example. The features and modifications of the several embodiments particularly shown and described are mutually interchangeable insofar as they are compatible. Thus, for example, a "control" emitter and receiver unit as illustrated in FIG. 6 may be used in the meters of FIGS. 7 and 9. Likewise, the valve member 115 of the meter shown in FIG. 7 may be located in a Venturi or other restricted passageway so as to be subjected to greater velocity changes. Still other modifications within the scope of the invention will be apparent to those skilled in the art.

What we claim and desire to secure by Letters Patent is:

1. A fluid flowmeter comprising a passageway for flow of the fluid to be measured, a radioactive emitter associated with the passageway, a receiver positioned to receive radiation from said emitter and comprising a semiconductor, the electrical resistance of which varies in accordance with the cumulative amount of radiation received, and means for varying the radiation received by said receiver in proportion to the rate of flow of fluid through said passageway, whereby the total change in resistance of said semiconductor in a selected period of time is proportional to the total cumulative amount of fluid flowing through said passageway during said period of time.

2. A meter according to claim 1 for measuring the flow of gas, in which said emitter and receiver are disposed on opposite sides of said passageway so that said radiation passes transversely through the gas stream and the amount of radiation received by said receiver increases with decrease in gas density resulting from increased rate of flow.

3. A fluid flowmeter comprising a passageway for flow of gaseous fluid to be measured, said passageway comprising a section of constant cross-sectional area and a section having a different cross-sectional area, for producing a change in density with change in velocity of flow of said gas, a radioactive emitter associated with the passageway on a side of said section of different area, a receiver positioned on the opposite side of said section of different area from said emitter to receive transversely through said fluid flow radiation from said emitter and comprising a semi-conductor, the electrical resistance of which varies in accordance with the cumulative amount of radiation received, whereby the total change in resistance of said semi-conductor in a selected period of time is proportional to the amount of fluid flowing through said passageway during said period of time.

4. A meter according to claim 3, in which said section of different cross sectional area comprised a Venturi.

5. A meter according to claim 4, in which a second emitter and a second receiver are disposed on opposite sides of said section of constant cross sectional area, said second receiver constituting a control for comparison with the first mentioned receiver.

6. A fluid flowmeter comprising a passageway for flow of the fluid to be measured, a radioactive emitter on one side of said passageway, a receiver disposed on the opposite side of said passageway for receiving radiation from said emitter and comprising a semi-conductor, the electrical resistance of which varies in accordance with the cumulative amount of radiation received, a valve member movably mounted in the passageway between the emitter and receiver and movable by fluid flow through the passageway to block the transmission of radiation from the emitter to the receiver to an extent proportional to the rate of flow, and thereby vary the amount of radiation received by the receiver, whereby the total change in the resistance of said semi-conductor in a selected period of time as proportional to the total cumulative amount of fluid flowing through said passageway during said period of time.

7. A meter according to claim 1, in which means is provided for releasably mounting said receiver for easy removal and for sealing said receiver in operative position to prevent removal by an unauthorized person.

8. A fluid flowmeter comprising a passageway for flow of the fluid to be measured, a manometer tube containing a body of liquid, means connecting said manometer tube with said passageway to produce displacement of said liquid proportional to the rate of flow of fluid through said passageway, a radioactive emitter and a receiver disposed at opposite sides of said manometer tube in such position that said body of liquid blocks radiation transmitted from said emitter to said receiver to an extent dependent upon the displacement of said liquid and hence proportional to the rate of flow of fluid through said passageway, said receiver comprising an element having a measurable characteristic that is progressively modified by said radiation in proportion to the total amount of radiation received.

9. A meter according to claim 8, in which said passageway comprises a Venturi and in which said manometer tube is connected to said Venturi.

10. A meter for measuring the flow of fluid through a pipe line comprising a sleeve in which opposing recesses are provided, means for connecting said sleeve in series with said pipe line, a radioactive emitter positioned in one said recess, a receiver positioned in the other said recess to receive radiation from said emitter and comprising an element having a measurable characteristic that is progressively modified by said radiation in proportion to the total cumulative amount of radiation received during a selected period of time, and means for varying the radiation received by said receiver in proportion to the rate of flow of fluid through said sleeve, whereby the total change in said characteristic of the receiver during said selected period of time is proportional to the total cumulative amount of fluid flowing through said sleeve during said period.

11. A meter according to claim 10, in which said sleeve is shaped to provide a Venturi and said recesses are located adjacent the throat portion of said Venturi.

12. A meter for measuring the flow of fluid through a pipe line comprising a sleeve in which opposing recesses are provided, means for connecting said sleeve in series with said pipe line, a radioactive emitter positioned in one said recess, a receiver positioned in the other said recess to receive radiation from said emitter and comprising an element having a measurable characteristic that is progressively modified by said radiation in proportion to the total cumulative amount of radiation received during a selected period of time, and a valve member which is pivotally mounted in said sleeve between said recesses in position at least partially to shield said receiver from the emitter and is swingable by fluid flow through the sleeve to vary the amount of shielding in proportion to the rate of flow of fluid through said sleeve, whereby the total change in said characteristic of the receiver during said selected period of time is proportional to the total cumulative amount of fluid flowing through said sleeve during said period.

13. A flowmeter for measuring an amount of fluid delivered over an extended period of time, said flowmeter comprising a passageway through which said fluid is delivered, a radioactive emitter of Beta radiation positioned at a side of said passageway for emitting radiation at an approximately uniform rate across said passageway, a radiation receiver comprising a semi-conductor having the characteristic of changing its electrical resistance by an amount proportional to the amount of accumulated exposure to Beta radiation, said receiver receiving said emitter radiation in amounts which vary in proportion to the rate of flow of said fluid in said passageway.

14. A fluid flowmeter as described in claim 13 characterized in that said emitter and receiver are positioned in recesses in the material defining said passageway and are separated therefrom by radiation permeable windows.

15. A fluid flowmeter as described in claim 13 characterized in that said passageway having means for restricting a section of said passageway for increasing the range of change of pressure and fluid density of said fluid.

16. A fluid flowmeter as described in claim 15 characterized in that the means for restricting a section of passageway comprises a Venturi tube.

References Cited in the file of this patent

UNITED STATES PATENTS

| | | |
|---|---|---|
| 2,304,910 | Hare | Dec. 15, 1942 |
| 2,316,239 | Hare | Apr. 13, 1943 |
| 2,501,174 | Herzog | Mar. 21, 1950 |
| 2,564,626 | MacMahon | Aug. 14, 1951 |
| 2,599,975 | Carpenter | June 10, 1952 |
| 2,671,174 | Burgholz | Mar. 2, 1954 |
| 2,680,816 | Stern | June 8, 1954 |
| 2,700,736 | Roberts | Jan. 25, 1955 |
| 2,714,168 | Hencke et al. | July 26, 1955 |
| 2,722,519 | Otley et al. | Nov. 1, 1955 |
| 2,757,292 | Schulman et al. | July 31, 1956 |
| 2,800,589 | Levy | July 23, 1957 |
| 2,896,084 | MacDonald | July 21, 1959 |